United States Patent [19]
Drymon

[11] Patent Number: 4,868,965
[45] Date of Patent: Sep. 26, 1989

[54] COMPACT UNIVERSAL STEERING WHEEL PULLING SYSTEM

[76] Inventor: Larry L. Drymon, 8919 River Island Dr.-Apt. 203, Savage, Md. 20763

[21] Appl. No.: 225,824

[22] Filed: Jul. 29, 1988

[51] Int. Cl.[4] ........................................ B23P 19/04
[52] U.S. Cl. ........................................ 29/259
[58] Field of Search ................. 29/256, 258, 259, 260, 29/263, 266, 264

[56] References Cited

U.S. PATENT DOCUMENTS

| | | | |
|---|---|---|---|
| 668,831 | 2/1901 | Docharty et al. | 29/259 |
| 1,383,382 | 7/1921 | Brockway | 29/260 |
| 2,485,022 | 10/1949 | Taylor | 29/256 |
| 4,372,024 | 2/1983 | Sherada | 29/260 |
| 4,771,528 | 9/1988 | Stromberg | 29/259 |

FOREIGN PATENT DOCUMENTS

| | | | |
|---|---|---|---|
| 623558 | 3/1927 | France | 29/259 |
| 425684 | 3/1935 | United Kingdom | 29/259 |

*Primary Examiner*—Robert C. Watson
*Attorney, Agent, or Firm*—Morton J. Rosenberg; David I. Klein

[57] ABSTRACT

A compact universal steering wheel pulling system (10) includes a yoke member (20) having a centrally located threaded through opening (22) formed therethrough. Yoke member (20) additionally is provided with a plurality of pairs of slotted through openings (24, 26 and 28) wherein each pair of slotted through openings has one slotted through opening diagonally displaced from the other, equidistantly about the centrally located through opening (22). Each pair of slotted through openings (24, 26 and 28) are dimensionally different each from the other to allow the steering wheel pulling system (10) to be utilized with a large variety of steering wheel configurations. To further facilitate the universal use of steering wheel pulling system (10) yoke member (20) is of sufficiently small size to be insertable within the hub (110) of steering wheel (100). In cooperation with the size of yoke member (20), a threaded member (30) is provided with a fine thread to provide adequate mechanical advantage in applying the pulling force. For use with hollow steering wheel shafts (120), steering wheel pulling system (10) is provided with a cap member (40) for transmitting the force from threaded member (30) to the steering column shaft (120).

16 Claims, 2 Drawing Sheets

COMPACT UNIVERSAL STEERING WHEEL PULLING SYSTEM

BACKGROUND OF THE INVENTION

1. Field of the Invention

This invention directs itself to pulling systems which separate two members frictionally coupled together. In particular, this invention directs itself to a compact pulling system for removing an automotive steering wheel from a steering column shaft having an advantageously small size so as to be usable with a large variety of steering wheel and steering column shaft combinations. More in particular, this invention pertains to steering wheel pulling systems having a dimensionally small yoke wherein a centrally located threaded through opening about which a plurality of pairs of slotted through openings are equidistantly formed therethrough. Further, this invention directs itself to steering wheel pulling systems which include a cap member for overlaying the end portion of a hollow steering column shaft for transferring the pulling force applied by a finely threaded member thereto.

2. Prior Art

Tools for applying a pulling force are well known in the art. The best prior art known to the applicant include U.S. Pat. Nos. 4,463,489; 4,492,014; 573,323; 1,324,704; 1,484,130; 1,522,983; 1,257,786; 1,383,382; 1,599,340; 1,494,832; 4,646,412; 1,787,070; 1,478,648; and, 222,646.

Some prior art systems, such as that shown in U.S. Pat. Nos. 4,463,489 and 4,492,014, are provided with yoke members having a centrally located threaded through opening through which the means for applying the pulling force is operably coupled. These systems also provide a pair of slotted through openings equidistantly spaced on opposing sides of the centrally located threaded opening. However, these systems do not provide for a large variety of alternative coupling configurations, providing only a limited variation within the scope of the single pair of slotted openings. Further, these systems are dimensionally large which would prohibit their use in many of the steering wheel pulling applications with which the instant invention can be utilized.

In other prior art systems, such as U.S. Pat. No. 1,522,983, there are provided systems including pulley systems having means for removal from a motor shaft. These systems provide a yoke-like element with a plurality of slotted openings formed about the central threaded opening. However, these pairs of slotted openings are arranged orthogonally with respect to each other and thereby do not provide for a large variety of wheel configurations, as provided by the instant invention. These systems do not provide: a yoke of small size, a plurality of pairs of slotted through openings formed in the yoke where each pair is dimensionally different from the others, and a force applying threaded member having adequate mechanical advantage to cooperatively function with the small size of the pulling system yoke, as provided by the instant invention.

SUMMARY OF THE INVENTION

A compact universal steering wheel pulling system is provided for removing an automotive steering wheel from a steering column shaft. The compact universal steering wheel pulling system includes a yoke member having a substantially parallelepiped contour and having a centrally located threaded through opening passing therethrough. Further, the yoke member is provided with a plurality of pairs of slotted through openings formed equidistantly about the centrally located threaded through opening. Each of the pairs of slotted through openings are dimensionally different each from the other. The compact universal steering wheel pulling system further includes a means for releasably slidingly fastening the yoke member to any one of the pairs of slotted through openings to the hub of the steering wheel. Also included is a means for applying a force between the yoke and the steering column shaft to which the steering wheel hub is coupled. The means for applying this force includes a finely threaded bolt for providing adequate mechanical advantage responsive to the dimensional size of the yoke, which is sufficiently small to be insertable within the steering wheel hub.

DESCRIPTION OF THE PREFERRED EMBODIMENTS

Figure 1:
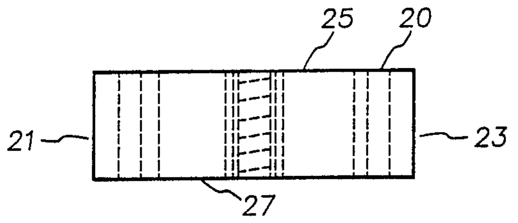
FIG. 1 is a side elevation view of the steering wheel pulling system yoke.

Referring now to FIGS. 1–7, there is shown compact universal steering wheel pulling system 10 for removing an automotive steering wheel from either solid or hollow steering column shafts. As will be seen in following paragraphs, compact universal steering wheel pulling system 10 is specifically directed to the concept of providing a means for removing an automotive steering wheel 100 from a steering column shaft 120 located within a steering column 130. Although not restricted to pulling steering wheels from steering column shafts, steering wheel pulling system 10 is particularly adapted for use with a wide variety of steering wheel configurations and is usable with both solid and hollow steering column shafts. In addition to being adaptable to various steering wheel mounting configurations, steering wheel pulling system 10 is specifically directed to the concept of providing a pulling system which is sufficiently small to be insertable within the hub 110 of steering wheel 100. The compact size of steering wheel pulling system 10 is particularly advantageous in that it is usable with a large variety of steering wheel designs, being insertable within the hub portion of these steering wheels and thereby not interfering with or contacting the radial spokes of the steering wheel or any decorative portions thereof. Obviously, the small size of steering wheel pulling system 10 provides convenience to the user, in that a smaller lighter tool is more easily handled and transported, as well as requiring less storage space.

Figure 2:
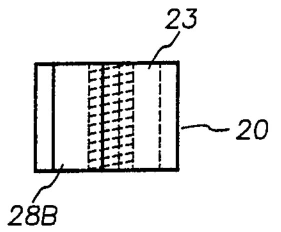
FIG. 2 is an end elevation view of the steering wheel pulling system yoke.
Figure 3:
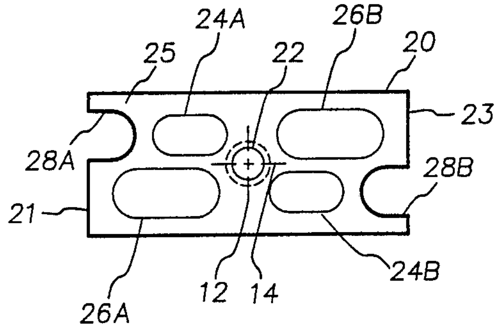
FIG. 3 is a plane view of the steering wheel pulling system yoke.

Compact universal steering wheel pulling system 10 includes a yoke 20, as shown in FIGS. 1–3. The yoke 20 is formed in a parallelepiped contour having opposing end surfaces 21 and 23, and opposing parallel planar surfaces 25 and 27. A threaded through opening 22 passes through yoke 20 between the parallel planar surfaces 25 and 27, and is centrally located thereon. As shown in FIG. 3, the threaded through opening 22 is centered on the rectangular planar surfaces 25 and 27 as indicated by the orthogonal reference lines 12 and 14.

Yoke 20 is further provided with a plurality of slotted through openings formed through the parallel planar surfaces 25 and 27. Each pair of slotted through openings 24, 26 and 28 are dimensionally different one from the other to provide for different steering wheel attachment configurations. Each pair of slotted through openings 24, 26 and 28 are arranged such that each of the slotted through openings of the pair of slotted through openings are diagonally displaced one from the other equidistantly from the reference lines 12 and 14, and therefore equidistantly from the centrally located threaded through opening 22. Each pair of slotted through openings 24, 26 and 28 provide alternate passages for the bolts 52 and 54, shown in FIG. 7, by which yoke member 20 is coupled to the steering wheel hub 110. The dimensions of slotted through openings 24, 26 and 28 and their location relative to the reference lines 12 and 14 have been predetermined so as to accommodate a great variety of steering wheel mounting hole locations, making steering wheel pulling system 10 adaptable to substantially all makes and models of automotive steering wheels 100.

In particular, slotted through openings **24*a* and 24*b* have a length dimension with an approximating range 0.38 to 0.44 inches and a width dimension having an approximating range of 0.25 to 0.31 inches. In one working embodiment, each of the slotted openings 24*a* and 24*b* had a length dimension of 0.41 inches and a width dimension of 0.28 inches. Each of the slotted through openings 24*a* and 24*b* are displaced longitudinally from opposing sides of the central reference line 12 by an approximating dimension of 0.44 inches, and in a transverse direction each of the slotted through openings 24*a* and 24*b* are displaced approximately 0.09 inches from opposing sides of the yoke reference center line 14**.

Each of the slotted through openings **26*a* and 26*b* are formed with a length dimension having an approximating range of 0.72 to 0.78 inches, and a width dimension having an approximating range of 0.31 to 0.37 inches. In one particular working embodiment, the slotted through openings 26*a* and 26*b* were formed with a length dimension of 0.75 inches and a width dimension of 0.34 inches. Each of the slotted through openings 26*a* and 26*b* are displaced longitudinally from opposing sides of the reference center line 12 by an approximate dimension of 0.25 inches, and displaced in a transverse direction from opposing sides of the reference center line 14** by a dimension of approximately 0.03 inches.

The slotted through openings **28*a* and 28*b* each extend to the respective side surface 21 and 23, and are open thereto. The slotted through openings 28*a* and 28*b* are formed with a length dimension having an approximating range of 0.30 to 0.36 inches, and a width dimension having an approximating range of 0.31 to 0.37 inches. In one working embodiment, the slotted through openings 28*a* and 28*b* are formed with a length dimension of 0.33 inches and a width dimension of 0.34 inches. Each of the slotted through openings 28*a* and 28*b* are longitudinally displaced from opposing sides of the reference center line 12 by an approximate dimension of 0.80 inches and displaced in the transverse direction from opposing sides of the reference center line 14** by an approximate dimension of 0.03 inches. Each of the aforementioned slotted through openings thus being diagonally displaced each from the other.

Thus, as shown in FIGS. 1–3 and 7, yoke 20 is provided with a centrally located threaded through opening 22 passing between opposing parallel planar surfaces 25 and 27. Located radially about the centrally located threaded through opening 22 are a plurality of pairs of slotted through openings 24, 26 and 28 for slidingly receiving through any of the pairs of slotted through openings, a pair of bolt type fasteners 52 and 54 for releasably coupling yoke 20 to the hub 110 of a steering wheel 100.

As a means of providing a universal tool for use with the many various makes and models of steering wheel 100, each of the pairs of slotted through openings are dimensioned differently, each having particular predetermined dimensions, and being displaced diagonally by predetermined dimensions. The overall size of yoke member 20 being defined by a length dimension approximating 2.25 inches, a width dimension approximating 1.0 inches, and a height thickness dimension approximating 0.75 inches. This compact size for yoke member 20 further contributes to the universality of the steering wheel pulling system 10. The small size of yoke member 20 permits it to be insertable within the hub 110 of steering wheel 100 without interfering with the steering wheel spoke configuration or the steering wheel's decorative trim.

Figure 4:
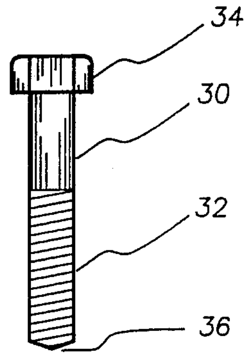
FIG. 4 is an elevation view of the force applying member for the steering wheel pulling system.
Figure 7:
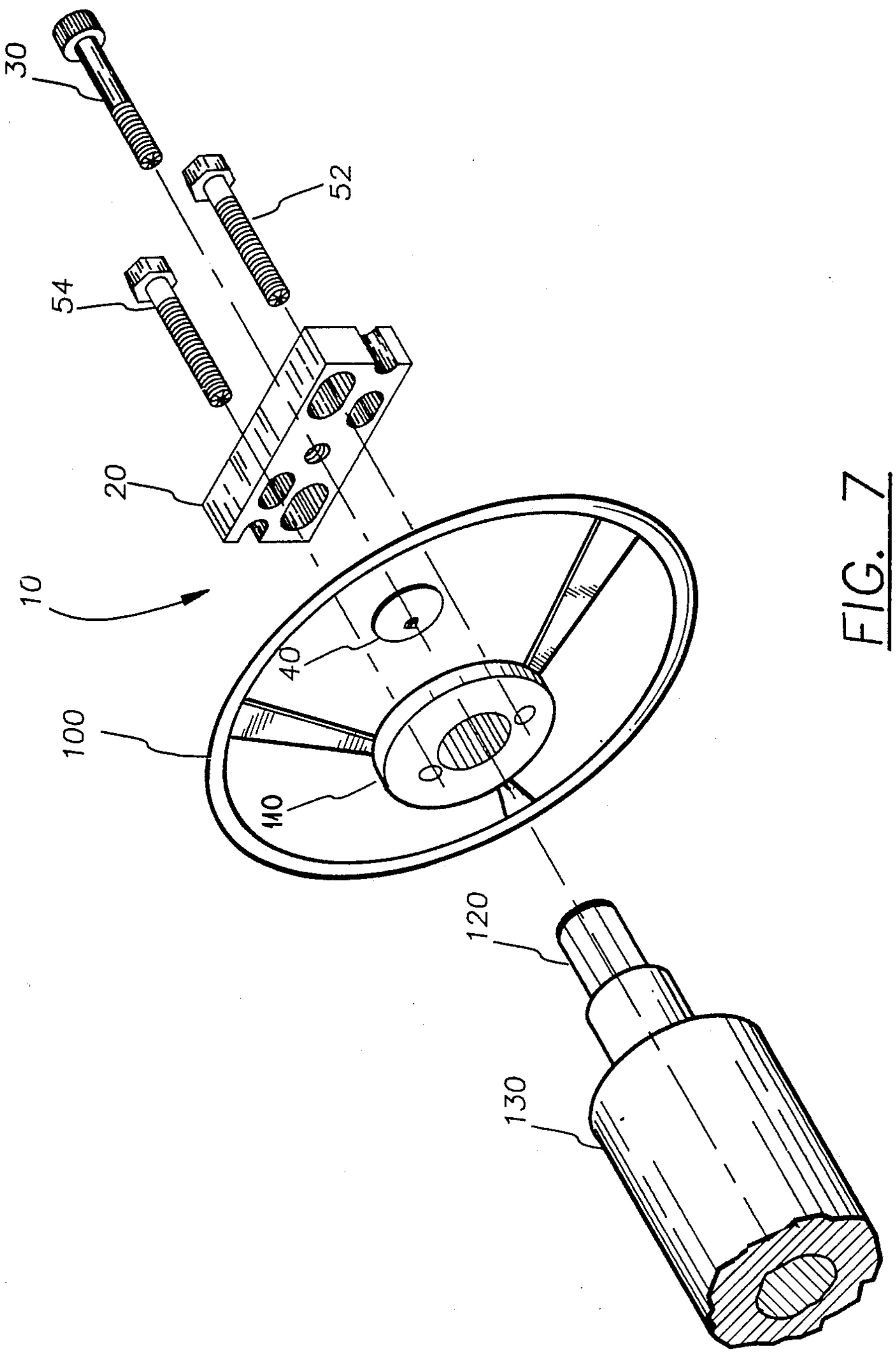

Referring now to FIG. 4, there is shown a threaded member 30 which provides the means to apply the pulling force between yoke member 20 and the steering column shaft 120, shown in FIG. 7. Threaded member 30 is provided with a head portion 34 to which a driving force from an appropriate tool can be coupled. Head portion 34 of threaded member 30 may have an external hexagonal contour, or be provided with a recess having a geometric contour adapted for receipt of a driving tool. On the opposing end of threaded member 30 a threaded portion 32 is provided having a fine thread formed thereon. Threaded member 30 has a diameter approximating 0.31 inches and at least 24 threads per inch formed on threaded portion 32. Threaded portion 32 terminates in an end portion 36 which may be conical or radiused in a semispherical contour, to provide a bearing surface for contact with the steering column shaft 120. The bearing surface 36 of threaded member 30 typically engages the end portion of the steering column shaft 120 while the threaded portion 32 is engaged to the yoke 20 within the threaded opening 22.

Figure 5:
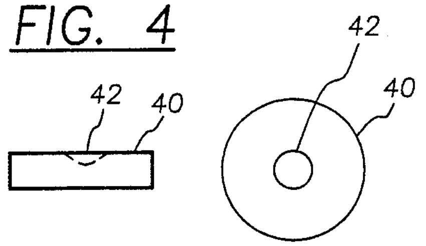
FIG. 5 is a plane and elevation view of the steering wheel pulling system cap member.

However, a number of automotive steering columns now make use of hollow shafts and therefore do not provide a corresponding surface for contact with the bearing end portion 36 of threaded member 30. For these applications, steering wheel pulling system 10 includes a cap member 40, as shown in FIG. 5, having a truncated cylindrical contour with an outside diameter of predetermined size, sufficiently large to overlay the end of the hollow steering column shaft. Cap member 40 is provided with a centrally located recess 42 for receipt of the bearing end surface 36 of threaded member 30. Recess 42 may have an internal semispherical or conical contour to correspond to the bearing end 36 of threaded member 30.

Figure 6:
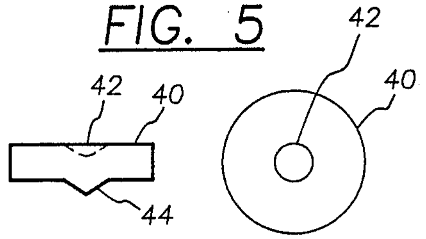
FIG. 6 is a plane and elevation view for an alternate embodiment of the cap member; and, FIG. 7 is an exploded perspective view of the steering wheel pulling system.

In an alternate configuration, shown in FIG. 6, cap member 40 is provided with a bearing surface receiving recess 42 on one end of cap member 40, and is provided with a centrally located projection 44 on the opposing end to serve a self centering function. The conically shaped projection 44 is insertable within the hollow portion of the steering column shaft 120 and in addition to centering cap member 42 also prevents horizontal displacement of cap member 40 as threaded member 30 is rotated within the recess 42 to apply the pulling force between cap member 40 and yoke 20.

As shown in FIG. 7, steering wheel pulling system 10 is coupled to a representative automotive steering wheel 100 by coupling yoke 20 to the steering wheel hub 110 by means of threaded fasteners 52 and 54. Threaded fasteners 52 and 54 pass through a corresponding pair of opposing diagonally displaced, slotted through openings, as previously described, to be threadedly coupled to steering wheel hub 110. Yoke member 20 being compact size, sufficiently small to be insertable within the hub 110 of steering wheel 100, and thereby allows the steering wheel 100 to be removed from the steering column shaft 120 without causing damage to the decorative trim and appearance of steering wheel 100. The small size of yoke 20 is facilitated by the fine thread formed on threaded member 30. The fine thread having at least twenty-four threads per inch provides a greater mechanical advantage than the coarsely threaded force applying members of typical wheel pullers.

Thus, the small size of yoke member 20 and the particular arrangement of slotted through openings for coupling yoke 20 to steering wheel hub 110 permits a steering wheel pulling system 10 to be used universally with substantially all known automotive steering wheel and steering column shaft combinations.

For those systems having hollow steering column shafts 120, steering wheel pulling system 10 is provided with a cap member 40 for transmitting the force applied by the threaded member 30 to the hollow shaft 120. Cap member 40 is formed with a centrally located recess 42 for receipt of the bearing surface end 36 of threaded member 30. Cap member 40 may also be provided with a projection 44 which is insertable within the hollow portion of the steering column shaft 120. The projection 44 serves to center cap member 40 on the hollow shaft 120 and prevents horizontal displacement of cap member 40 as the bearing surface 36 of threaded member 30 rotates within the recess 42.

Although this invention has been described in connection with specific forms and embodiments thereof, it will be appreciated that various modifications other than those discussed above may be resorted to without departing from the spirit or scope of the invention. For example, equivalent elements may be substituted for those specifically shown and described, certain features may be used independently of other features, and in certain cases, particular locations of elements may be reversed or interposed, all without departing from the spirit or scope of the invention as defined in the appended claims.

What is claimed is:

1. A compact universal steering wheel pulling system for removing an automotive steering wheel from a steering column shaft wherein said steering wheel includes a centrally located hub coupled to said shaft, said hub and shaft combination being defined by any one of a plurality of coupling configurations, comprising:

a yoke member having a substantially parallelepiped contour being defined by (1) a length dimension approximating 2.25 inches, (2) a width dimension approximating 1.0 inches, and (3) a height dimension approximating 0.75 inches, said yoke member having a centrally located threaded through opening passing therethrough, said yoke member further having a plurality of pairs of slotted through openings formed equidistantly about said centrally located threaded through opening, each of said pairs of slotted through openings being dimensionally different each from the other;

means for releasable slidingly fastening said yoke member through any one of said pairs of slotted openings to said steering wheel hub; and, means for applying a force between said yoke member and said steering column shaft to remove said steering wheel therefrom, said means for applying a force including a finely threaded bolt having a diameter approximating 0.31 inches with at least 24 threads per inch formed thereon to provide sufficient mechanical advantage for enabling said dimensions of said yoke member to be sufficiently small to be insertable within said hub.

2. The compact universal steering wheel pulling system as recited in claim 1 wherein said means for applying a force between said yoke member and said steering column shaft includes a cap member for use with a hollow steering column shaft.

3. The compact universal steering wheel pulling system as recited in claim 2 wherein said cap member is provided with a centrally located recess for receipt of said finely threaded bolt.

4. The compact universal steering wheel pulling system as recited in claim 2 wherein said cap member is provided with (1) a centrally located recess on one side thereof for receipt of said finely threaded bolt, and (2) a centrally located projection on an opposing side thereof for insertion into said hollow steering column shaft to center said cap member thereon.

5. The compact universal steering wheel pulling system as recited in claim 1 wherein each of at least one pair of said slotted through openings extends to an opposing perimeter edge of said yoke member and is open thereto.

6. The compact universal steering wheel pulling system as recited in claim 5 wherein a first and a second slotted through opening of one of said pairs of slotted through openings is defined by a length dimension having an approximating range of 0.72 to 0.78 inches and a width dimension having an approximating range of 0.31 to 0.37 inches, each of said first and second slotted through openings being displaced from a central reference of said yoke member by an approximating dimension of 0.25 inches in a longitudinal direction and 0.03 inches in a transverse direction, each of said first and second slotted through openings being displaced on opposing sides of said central reference.

7. The compact universal steering wheel pulling system as recited in claim 6 wherein a first and a second slotted through opening of another of said pairs of slotted through openings is defined by a length dimension having an approximating range of 0.38 to 0.44 inches and a width dimension having an approximating range of 0.25 to 0.31 inches, each of said first and second slotted through openings being displaced from said central reference of said yoke member by an approximating dimension of 0.44 inches in said longitudinal direction and 0.09 inches in said transverse direction, each of said first and second slotted through openings being displaced on opposing sides of said central reference.

8. The compact universal steering wheel pulling system as recited in claim 7 wherein a first and a second slotted through opening of said pair of slotted through openings extending to said perimeter edges of said yoke member is defined by a length dimension having an approximating range of 0.30 to 0.36 inches and a width dimension having an approximating range of 0.31 to 0.37 inches, each of said first and second slotted through openings being displaced from said central reference of said yoke member by an approximating dimension of 0.80 inches in said longitudinal direction and 0.03 inches in said transverse direction, each of said first and second slotted through openings being displaced on opposing sides of said central reference.

9. A compact universal automotive steering wheel pulling system adapted for removing steering wheels from both solid and hollow steering column shafts, comprising:

a yoke member having a pair of opposing parallel planar surfaces through which is formed (1) a centrally located threaded opening, and (2) a plurality of pairs of slotted openings, each of said pairs of slotted openings having one slotted opening diagonally displaced from the other equidistantly about said threaded opening, each of said pairs of slotted openings being dimensionally different one pair from the other, said yoke member being defined by (1) a length dimension approximating 2.25 inches, (2) a width dimension approximating 1.0 inches, and (3) a height dimension approximating 0.75 inches;

means for reversibly coupling said yoke member to said steering wheel, said means for coupling being slidingly coupled to said yoke member through any one of said pairs of slotted openings; and, means for applying a force between said yoke member and said hollow or solid steering column shaft to remove said steering wheel therefrom, said means for applying a force between said yoke member and said steering column shaft includes a finely threaded bolt having an approximating diameter of 0.31 inches with at least 24 threads per inch being formed thereon, whereby sufficient mechanical advantage is thereby provided for enabling said dimensions of said yoke member to be sufficiently small to be insertable within a hub portion of said steering wheel.

10. The compact universal automotive steering wheel pulling system as recited in claim 9 wherein said means for applying a force between said yoke member and said steering column shaft further includes a cap member for use with said hollow steering column shaft.

11. The compact universal automotive steering wheel pulling system as recited in claim 10 wherein said cap member is provided with a centrally located recess for receipt of said finely threaded bolt.

12. The compact universal automotive steering wheel pulling system as recited in claim 10 wherein said cap member is provided with (1) a centrally located recess on one side thereof for receipt of said finely threaded bolt, and (2) a centrally located projection on an opposing side thereof for insertion into said hollow steering column shaft to center said cap member thereon.

13. The compact universal automotive steering wheel pulling system as recited in claim 9 wherein each of at least one pair of said slotted openings extends to an opposing perimeter edge of said yoke member and is open thereto.

14. The compact universal automotive steering wheel pulling system as recited in claim 13 wherein a first and a second slotted opening of one of said pairs of slotted openings is defined by a length dimension having an approximating range of 0.72 to 0.78 inches and a width dimension having an approximating range of 0.31 to 0.37 inches, each of said first and second slotted openings being displaced from a central reference of said yoke member by an approximating dimension of 0.25 inches in a longitudinal direction and 0.03 inches in a transverse direction, each of said first and second slotted through openings being displaced on opposing sides of said central reference.

15. The compact universal automotive steering wheel pulling system as recited in claim 14 wherein a first and a second slotted opening of another of said pairs of slotted openings is defined by a length dimension having an approximating range of 0.38 to 0.44 inches and a width dimension having an approximating range of 0.25 to 0.31 inches, each of said first and second slotted openings being displaced from said central reference of said yoke member by an approximating dimension of 0.44 inches in said longitudinal direction and 0.09 inches in said transverse direction, each of said first and second slotted openings being displaced on opposing sides of said central reference.

16. The compact universal automotive steering wheel pulling system as recited in claim 15 wherein a first and a second slotted opening of said pair of slotted openings extending to said perimeter edges of said yoke member is defined by a length dimension having an approximating range of 0.30 to 0.36 inches and a width dimension having an approximating range of 0.31 to 0.37 inches, each of said first and second slotted openings being displaced from said central reference of said yoke member by an approximating dimension of 0.80 inches in said longitudinal direction and 0.03 inches in said transverse direction, each of said first and second slotted through openings being displaced on opposing sides of said central reference.

* * * * *